United States Patent [19]

Savant et al.

[11] Patent Number: 5,230,969
[45] Date of Patent: Jul. 27, 1993

[54] COMPOSITE GRAFT OPTICAL POLYMER

[75] Inventors: Gajendra Savant, Pasadena; Tomasz Jannson, Torrence, both of Calif.

[73] Assignee: Physical Optics Corporation, Torrance, Calif.

[21] Appl. No.: 564,597

[22] Filed: Aug. 9, 1990

[51] Int. Cl.$^5$ .............................................. G03C 1/66
[52] U.S. Cl. ...................................... 430/2; 430/289
[58] Field of Search ................................... 430/289, 2

[56] References Cited

U.S. PATENT DOCUMENTS

| | | | |
|---|---|---|---|
| 3,617,274 | 10/1971 | Lin | 430/2 X |
| 3,658,526 | 4/1972 | Haugh | 96/27 |
| 4,076,772 | 2/1978 | Murbach et al. | 264/2 |
| 4,264,706 | 4/1981 | Sutton et al. | 430/289 X |
| 4,422,713 | 12/1983 | Grant et al. | 430/1 |
| 4,588,664 | 5/1986 | Fielding et al. | 430/1 |
| 4,769,301 | 9/1988 | Butcher et al. | 430/2 |
| 4,788,115 | 11/1988 | Long et al. | 430/2 |
| 4,904,554 | 2/1990 | Wreede | 430/2 |
| 4,985,339 | 1/1991 | Koizumi et al. | 430/288 X |

FOREIGN PATENT DOCUMENTS

| | | | |
|---|---|---|---|
| 52-15321 | 2/1977 | Japan | 430/289 |
| 90/08344 | 7/1990 | PCT Int'l Appl. | 430/2 |

OTHER PUBLICATIONS

No. 19532, "Dichromated hydrophilic colloid–latex copolymer composition", *Research Disclosure*, Jul. 1980, p. 284.
R. G. Brandes et al., "Preparation of Dichromated Gelatin Films for Holography", *Applied Optics*, vol. 8, No. 11, Nov. 1969, pp. 2346–2348.
D. H. Close, "Hologram Recording on Photopolymer Materials", *Applied Physics Letters*, vol. 14, No. 5, pp. 159–160 (1969).
R. K. Curran, "The Mechanism of Hologram Formation in Dichromated Gelatin", *Applied Optics*, vol. 9, No. 7, pp. 1651–1657 (1970).
K. Panduranga Rao, "Collagen–poly(methyl methacrylate) graft copolymers: Effect . . . composition", Die Makro. Chemie 175, 729–737 (1974).
R. Van Renesse, Photopolymers in Holography (Feb. 1972).
N. Sadlej, B. Smolinska, Stable photo-sensitive Polymer Layers for Holography, Optics and Laser Technology, pp. 175–180, Aug. 1975.
R. Bartolini, Review and Analysis of Optical Recording Media Optical Engineering, vol. 15(2), pp. 99–108, Mar./Apr. 1976.
B. Booth, Recent Photopolymer Development for Holographic and Laser Recording, Holosphere, vol. 5, No. 5, pp. 1–8, May 1976.
T. Kuwajima, Graft Polymerization of Methyl Methacrylate Onto Gelatin Journal of Appl. Polymer Science, vol. 20, 976-973 (1976).
P. Hariharan, Holographic Recording Materials: Recent Developments Optical Engineering, vol. 19, No. 5, pp. 636–641, Sep./Oct. 1980.
K. Raghunath, Grafting of Poly(Vinyl Pyrrolidone) onto Gelatin and . . . Plasma Expander, E. Polym. J., vol. 21, No. 2, pp. 195–199 (1985).
S. Duncan, Holographic Filters in Dichromated Gelatin Position Tuned . . . Region, Opt. Engineering 24(5), 781–783 (Sep./Oct. 1985).
J. Jenney, Recent Developments in Photopolymer Holography, Hughes Research Laboratories.
K. Panduranga Rao, Characterization of the Collagen–Vinyl Graft . . . Properties, J. of Polym. Science, Part A-1, vol. 9, 3199–3212 (1971).

*Primary Examiner*—Cynthia Hamilton
*Attorney, Agent, or Firm*—Nilles & Nilles

[57] ABSTRACT

A holographic recording material, comprising a dichromated gelatin-polymer graft, is used in a volume hologram. The gelatin may comprise naturally occurring gelatin primarily made up of glycerin, proline, and hydroxyproline. The polymerizable monomers used to make up the gelatin polymer graft may comprise 2-hyroxyethylmethacralate, acrylamide, acrylic acid, or vinyl acetate.

3 Claims, 3 Drawing Sheets

COMPOSITE GRAFT OPTICAL POLYMER

BACKGROUND OF THE INVENTION

1. Field of the Invention

The present invention pertains to holographic recording materials. More particularly the present invention pertains to composite graft polymers and their use in producing holographic optical elements with unique characteristics not achievable with currently available holographic recording materials.

2. Description of the Prior Art

Although a variety of materials and material systems have been utilized as holographic recording materials including silver halide, dichromated gelatin, ferroelectric crystals, thermoplastics, photo-resists and photopolymers, none can simultaneously fulfill the rigid requirements of high resolution, high sensitivity, low noise, ease of processing, and high transmissivity of short wavelengths. The following articles, incorporated by reference herein, describe some of these materials: J. W. Gladden, "Review of Photosensitivity Materials for Holographic Recording," Technical Report ETL-0128, U.S. Army Engineer Topographic Laboratory, April 1978; P. Hariharan, "Holographic Recording materials: Recent Developments," Optical Engineering Vol. 19, page 636, (1980); L. Solymar and D. J. Cooke, "Holographic Recording Materials", page 254–304 in Volume Holography and Volume Grating, Academic Press, N.Y., 1981.

For example, silver halide photographic emulsion for holography has shortcomings associated with scattering due to the granular structure of the recording medium, wet and multi-step chemical processing, maintaining the modulation transfer function at higher spatial frequencies, wavelength tunability, bandwidth, and instability at high temperatures. Photoelectric crystals, such as lithium niobate ($LiNbO_3$), bismuth silicon oxide (BSO), bismuth germanium oxide (BGO), strasium barium nitrate (SBN) and PLZT ceramics have drawbacks related to the build-up of scattering which occurs during storage and readout owing to the formation of parasitic gratings. Reflectance phenomena are discussed in W. D. Corish, L. Young, J. Appl. Phy. 46, 1252 (1974) incorporated by reference herein.

Thermoplastics as holographic recording materials provide low efficiency holograms due to low resolution, low sensitivity, and low signal to noise ratio. This is discussed in T. Saito, T. Im Amura, J. Honda & J. Tsujnichi, J. Opt. 9, 325 (1978) incorporated by reference herein. Use of photoresists is limited to surface relief hc'ography resulting in low efficiency surface holograms. Photopolymers appear to be useful as holographic recording materials. Potential problems of decreased signal to noise ratio, scattering, and low diffraction efficiency limit their performance as an effective recording polymer and lessen their desirability. Furthermore, with synthetic polymers, only limited bandwidth (40–50 nm), restricted wavelength tunability, and lower diffraction efficiency are possible. Recently Du Pont has presented (SPIE, Los Angeles, 1990) the results of their holographic photopolymer as a volume holographic recording material. Du Pont photopolymer has certain advantages such as dry processing and ease of fabrication and handling. This photopolymer, however, cannot be used where broad bandwidth is necessary in certain applications such as laser hardening. Moveover, it has a limited range of sensitivity. Similar problems exist in Polaroid's DMP-128 photopolymer which further requires wet processing and extra surface treatment of the finished hologram.

Gelatins, particularly dichromated gelatins (DCG), are often used as holographic recording materials. 'Gelatin' is a product obtained by the partial hydrolysis of collagen derived from the skin, white connective tissues, and bones of animals. In collagen, three chains are twisted around one another to form a three-stranded helix, which is converted into water soluble protein from which water soluble gelatin is obtained. Chemically, gelatin is an albumin containing chains of amino acids. A single amino acid molecule roughly contains 2000 amino acid units, and there can be 20 or more different units in each molecule. Thus, the molecular weight of gelatin can range from 100,000–300,000, depending upon the amino acid moieties. The common molecular formula for an amino acid is:

Every third atom of the amino acid chain has a side chain substituent while consecutive oxygen and amino groups for the long chain of the chemical structure of gelatin depend upon the particular amino acid unit involved:

where R may be - H for glycine, R' may be for Valine and R" may be for Tyrosine. Basically gelatin is composed of a glyprohydroxyproline repeat unit—which is more than 30% to 70% of the molecule depending upon the type of gelatin and its origin. Commonly found amino acid structures in gelatin are listed below including their individual proportions in the gelatin chain.

Table 1 illustrates the chemical structures of amino acids and Table 2 lists the amount of each amino acid found in gelatin. The percentage of amino acids depends upon the source of gelatin.

TABLE 1
Chemical Structure Of Amino Acids Generally Found In Gelatin Polymer

| | | |
|---|---|---|
| ⁻O—C—CH—NH₃⁺<br>‖ \|<br>O  H | ⁻O—C—CH—NH₃⁺<br>‖ \|<br>O  CH₃ | ⁻O—C—CH—NH₃⁺<br>‖ \|<br>O  CH₂<br>   \|<br>   OH |
| Glycine (Gly)<br>M.W.: 75.07 | Alanine (Ala)<br>M.W.: 89.09 | Serine (Ser)<br>M.W.: 105.09 |
| ⁻O—C—CH—NH₃⁺<br>‖ \|<br>O  CH₂<br>   \|<br>   SH | ⁻O—C—CH—NH₃⁺<br>‖ \|<br>O  CH₂<br>   \|<br>   S<br>   \|<br>   S<br>   \|<br>   O  CH₂<br>   ‖  \|<br>⁻O—C—CH—NH₃⁺ | ⁻O—C—CH—NH₃⁺<br>‖ \|<br>O  CH₂<br>   \|<br>   C=O<br>   \|<br>   OH |
| Cysteine (CySH)<br>M.W.: 121.16 | Cystine (Cys—SCy)<br>M.W.: 240.30 | Aspartic Acid (Asp)<br>M.W.: 133.10 |
| ⁻O—C—CH—NH₃⁺<br>‖ \|<br>O  CH—CH₃<br>   \|<br>   CH₃ | ⁻O—C—CH—NH₃⁺<br>‖ \|<br>O  CHOH<br>   \|<br>   CH₃ | ⁻O—C—CH—NH₃⁺<br>‖ \|<br>O  CH₂<br>   \|<br>   (phenyl ring) |
| Valine (Val)<br>M.W.: 117.15 | Threonine (Thr)<br>M.W.: 119.12 | Phenylalanine (Phe)<br>M.W.: 165.19 |
| ⁻O—C—CH—NH₃⁺<br>‖ \|<br>O  CH₂<br>   \|<br>   (phenyl ring)<br>   \|<br>   OH | ⁻O—C—CH—NH₃⁺<br>‖ \|<br>O  CH₂<br>   \|<br>   (imidazole ring, NH, N) | ⁻O—C—CH—NH₃⁺<br>‖ \|<br>O  CH₂<br>   \|<br>   CH₂<br>   \|<br>   S<br>   \|<br>   CH₃ |
| Tyrosine (Tyr)<br>M.W.: 181.19 | Histidine (His)<br>M.W.: 155.16 | Methionine (Met)<br>M.W.: 149.21 |
| ⁻O—C—CH—NH₃⁺<br>‖ \|<br>O  CH₂<br>   \|<br>   CH₂<br>   \|<br>   C=O<br>   \|<br>   OH | ⁻O—C—CH—NH₃⁺<br>‖ \|<br>O  CH₂<br>   \|<br>   CH—CH₃<br>   \|<br>   CH₃ | ⁻O—C—CH—NH₃⁺<br>‖ \|<br>O  CH—CH₃<br>   \|<br>   CH₂<br>   \|<br>   CH₃ |
| Glutamic Acid (Glu)<br>M.W.: 147.13 | Leucine (Leu)<br>M.W.: 131.17 | Isoleucine (Ileu)<br>M.W.: 131.17 |
| ⁻O—C—CH—NH₂<br>‖ \|<br>O  CH₂<br>   \|<br>   CH₂<br>   \|<br>   CH₂<br>   \|<br>   CH₂<br>   \|<br>   ⁺NH₃ | | ⁻O—C—CH—NH₂<br>‖ \|<br>O  CH₂<br>   \|<br>   CH₂<br>   \|<br>   CH₂<br>   \|<br>   NH<br>   \|<br>   C=N⁺H₂<br>   \|<br>   NH₂ |
| Lysine (Lys)<br>M.W.: 146.19 | | Arginine (Arg)<br>M.W.: 174.20 |

TABLE 1-continued
Chemical Structure Of Amino Acids Generally Found In Gelatin Polymer Hydroxyproline (Hypro)    Proline (Pro)
M.W.: 131.13              M.W.: 115.13

TABLE 2
Gelatin Molecular Formula

| AMINO ACID | % COMPOSITION | MOL. WT. |  | RATIO OF AMINO ACID UNITS IN MOL. FORMULA | |
|---|---|---|---|---|---|
| Cystine(s) | 0.1 | 240 | = 0.000417 | 0.000417 = | 1 |
| Cysteine(s) | 0.1 | 121 | = 0.000825 | 0.000417 = | 2 |
| Serine | 0.4 | 105 | = 0.0381 | 0.000417 = | 9 |
| Tyrosine* | 0.5 | 181 | = 0.00277 | 0.000417 = | 7 |
| Histidine | 0.8 | 155 | = 0.00517 | 0.000417 = | 12 |
| Methionine(s) | 1.0 | 149 | = 0.00670 | 0.000417 = | 16 |
| Isoleucine | 1.4 | 131 | = 0.0107 | 0.000417 = | 26 |
| Threonine | 1.9 | 119 | = 0.0160 | 0.000417 = | 38 |
| Phenylalanine | 2.2 | 165 | = 0.0134 | 0.000417 = | 32 |
| Valine | 2.5 | 117 | = 0.0214 | 0.000417 = | 51 |
| Leucine | 3.2 | 131 | = 0.0245 | 0.000417 = | 59 |
| Lysine* | 4.1 | 146 | = 0.0281 | 0.000417 = | 67 |
| Aspartic Acid* | 6.6 | 133 | = 0.0496 | 0.000417 = | 119 |
| Arginine* | 8.1 | 174 | = 0.0466 | 0.000417 = | 112 |
| Alanine | 8.7 | 89 | = 0.0975 | 0.000417 = | 234 |
| Glutamic Acid* | 11.4 | 147 | = 0.0775 | 0.000417 = | 186 |
| Hydroxyproline | 14.1 | 131 | = 0.108 | 0.000417 = | 259 |
| Proline | 18.0 | 115 | = 0.156 | 0.000417 = | 374 |
| Glycine | 25.5 | 75 | = 0.340 | 0.000417 = | 815 |
| TOTALS | 110.6% |  |  |  | 2431 |

(s)Denotes sulfur containing amino acids.
*Denotes the polar amino acids.

With regard to grafting generally, grafting of polymers has in the past been used to alter the mechanical properties such as tensile strength, impact strength, extensibility, etc. of a number of polymers. For example moisture permeability of nylon can be significantly reduced by grafting styrene on nylon whereas grafting of acrylonitrile on polyethelene film reduces gas permeability. Grafting of acrylonitrile on silicon rubber has improved the solvent resistance of silicon rubber. Other functionalities such as dyeability and adhesion can be enhanced through grafting. Compared to polystyrene or poly-1-butene, the polystyrene-graft-1-butene polymer exhibits much higher values of dielectric constant and dielectric loss factor, Petoraro, M., Beati, E., Severini, F., Chem. Ind (Milan) 42, 843 (1960). Grafting and crosslinking techniques also have been used to increase the hardness, durability, and wear resistance of rubber.

With regard to grafting of gelatin, a gelatin graft is a chemical modification of its molecular structure through extended derivatization of chemically active groups in gelatin molecules. These active groups are either the end groups or side chain groups. Deamination of amino groups of gelatin by nitrous acid and removal of guanidine (from arginine) by hypobromite oxidation has been carried out as discussed in A. W. Kenchington, Bichem J. 68, 458 (1958); and P. Davis in G. Staisby ed., "Recent Advances in Gelatin and Glue Research", Pergamon Press, London, 1958, p.225 incorporated by reference herein. Phthalated and carbamoylated gelatin for the photographic industry and arylsulfonylated gelatin for microencapsulation are a few of the chemically modified gelatin formulations used for commercial purposes. These modified gelatins are discussed in U.S. Pat. No. 3,184,312 (assigned to Eastman Kodak); British Patent No. 1,075,952 (assigned to Gelatin and Glue Research Assoc.) incorporated by reference herein.

Gelatin also has been derivatized by epoxides, cyclic sulfones, and cyanamide. These derivatizations are discussed in Belgium Patent No. 672,906 (assigned to GAF Corporation); British Patent No. 1,033,189 (assigned to Kodak, Ltd.); and British Patent No. 1,100,842 (assigned to American Cyanamide) incorporated by reference herein. Grafting of acrylic polymers—through active double bonds—is disclosed in U.S. Pat. No. 3,291,611 (assigned to Swift & Co) incorporated by reference herein.

Dichromated Gelatin (DCG) exhibits ideal properties useful for volume phase holograms but there are significant potential drawbacks of DCG, and holographic optical elements based on it are easily affected by environmental changes such as temperature, pressure, wind, etc. Furthermore, high scatter, precipitation, and haze generally plague DCG coatings and holograms especially in shorter wavelengths. The need for a holographic material that combines the advantages of a desirable holographic material, yet avoids the drawbacks of many of the prior art materials is apparent.

SUMMARY OF INVENTION

A general object of this invention is a holographic recording material comprising a gelatin-polymer graft. A further object of this invention is to synthesize gelatin-polymer grafts such that the performance of the gelatin graft as a holographic recording material is higher than that o ordinary gelatin itself. By modifying the molecular structure of gelatin by chemical or photochemical enriched grafting of polymerizable monomers, a novel material has been achieved which combines the high performance characteristics of DCG and photopolymers and avoids the drawbacks of known holographic materials. Because of the gelatin-polymer interaction and integration at the molecular level, an increased number of cross-linking sites are generated. During exposure and/or processing the cross links form a network of molecular chains which directly contribute to the refractive index modulation of the material. The enhanced cross links also harden the system making it more stable to environmental changes, retaining the chemical composition intact under high temperature and pressure conditions.

In the method of synthesizing gelatin-polymers grafts, a suitably rigid type of gelatin is attached to one of the reactive sites of a polymerizable monomer compatible with the gelatin either in the solution state or in the swollen state using an appropriate catalyst. An initiator may be added which starts the chain building reaction in the monomer molecules under suitable reaction and mixing conditions including rate of stirring, reaction temperature, reaction time and filtration conditions. Further aspects of the method of synthesizing the novel graft polymer include coating using suitable spin rate, duration of spin, dip coating, doctor's blade, solution cast, etc., and processing so that the bandwidth, wavelength tunability, and temperature stability of the holographic graft polymer optical elements are further enhanced.

DESCRIPTION OF THE PREFERRED EMBODIMENTS

The various gelatins which may be used in the invention are given below for the purpose of illustration, but not limitation:

A. VEE GEE brand 300 Type A Gelatin from acid conditioned collagen in the form of a dry, granular powder with a particle size of about 40 Mesh, having a very light amber color and a bland, typical bouillon-like flavor and odor which is insoluble in cold water, but soluble in hot water having a clarity of a 1–40 solution not turbid when viewed through a $2\frac{1}{4}''$ layer, isoelectric point of jelly strength of 295–305 Bloom, viscosity of 50–65 mps, pH of 4.5–5.3, ash content of 2% maximum, moisture content of 10% maximum, and a bacteria count of 3000 per/gram maximum and negative E. coli and Salmonella.

B. VEE GEE 275 BLOOM Type A Gelatin having the same characteristics as the 300 Bloom Gelatin but with a 275–285 strength, 45–55 mps viscosity, 4.5–5.0 pH, not more than 2% ash, and approximately 10% moisture.

C. KNOX BLOOM 269 Type T-528: bloom g $6\frac{5}{8}\%$ 269; viscosity mp $6\frac{5}{8}\%$ at 60° C. 44.8; color at $1\frac{1}{2}\%$ 22; clarity at $1\frac{1}{2}\%$ 6; conductivity 2% at 20° C. 125; moisture 10.9%; pH at $1\frac{1}{2}\%$ 5.91; isoionic pH (pI) at $1\frac{1}{2}\%$ 5.17; buffer no. 18.0; ashes 0.36%; calcium & magnesium 0.1130%; labil sulfur (abribat) ppm 1.6; and reducing substances ppm 9.82.

D. KNOX BLOOM 206 Type T-5284: bloom g 6 3/2% 206; viscosity mp $6\frac{5}{8}\%$ at 60° C. 51.8; color at $1\frac{1}{2}\%$ 11; conductivity 2% at 20° C. 175; moisture 11.3%; pH at $1\frac{1}{2}\%$ 6.25; isoionic pH (pI) at $1\frac{1}{2}\%$ 5.13; buffer no. 20.5; ashes 0.38%; calcium & magnesium 1%; labile sulfur (abribat)ppm 1.2; reducing substances ppm 10.2.

E. KNOX BLOOM 106 Type T-5285: bloom g $6\frac{5}{8}\%$ 160; viscosity mp $6\frac{5}{8}\%$ at 60° C. 35.5; color at $1\frac{1}{2}\%$ 37; clarity at $1\frac{1}{2}\%$ 12; conductivity 2% at 20° C. 150; moisture 10.0%; pH at $1\frac{1}{2}\%$ 5.53; isoionic pH (pI) at $1\frac{1}{2}\%$ 5.17; buffer no. 21.1; ashes 0.42%; calcium & magnesium 0.0712%; labile sulfur (abribat) ppm 1.2; and reducing substances ppm 14.4.

Polymerizable monomers which may be used to graft with the gelatins are given below in Table 3 by way of example, but not limitation:

TABLE 3

Polymerizable Monomers, and their Chemical Structures (Aldrich and Polysciences - Producers)

| MONOMER | CHEMICAL STRUCTURE |
|---|---|
| 1. Acrylamide | $H_2C=CHCONH_2$ |
| 2. Acrylic Acid | $H_2C=CHCOOH$ |
| 3. 2-Acrylamide glycolic Acid Monohydrate | $H_2C=CHCONHCH(OH)COOH \cdot H_2O$ |
| 4. Hydroxyethyl methacrylate | $H_2C=C(CH_3)CO_2CH_2CH_2OH$ |
| 5. Hydroxyethyl acrylate | $CH_2=CH \cdot CO_2CH_2CH_2OH$ |
| 6. Methacrylic Acid | $H_2C=C(CH_3)COOH$ |
| 7. Barium Acrylate | $\begin{array}{c} H_2C=CH \cdot COO \\ \phantom{xxxxxxxxxxxx} \diagdown \\ \phantom{xxxxxxxxxxxxxxx} Ba \\ \phantom{xxxxxxxxxxxx} \diagup \\ CH_2=CHCOO \end{array}$ |
| 8. N-methyl-acrylamide | $H_2C=CHCONHCH_3$ |
| 9. N,N-Dimethyl acrylamide | $H_2C=CHCON(CH_3)_2$ |
| 10. N-methyl methacrylamide | $H_2C=C(CH_3)C(=O)N(H)CH_3$ |

TABLE 3-continued

Polymerizable Monomers, and their Chemical Structures (Aldrich and Polysciences - Producers)

| MONOMER | CHEMICAL STRUCTURE |
|---|---|
| 11. N-ethyl methacrylamide | $H_2C=C(CH_3)-C(=O)-HN-CH_2CH_3$ |
| 12. N(2-hydroxyethyl) methacrylamide | $H_2C=C(CH_3)-C(=O)-HN-CH_2CH_2OH$ |
| 13. N,N (di-2-hydroxyethyl) methacrylamide | $H_2C=C(CH_3)-C(=O)-N(CH_2CH_2OH)_2$ |
| 14. N (tris [hydroxymethyl] aminomethane) acrylamide | $H_2C=CH-C(=O)-NH-C(CH_2OH)_3$ |
| 15. Dimethacrylamide | $H_2C=C(CH_3)-C(=O)-NH-C(=O)-C(CH_3)=CH_2$ |
| 16. Vinyl Acetate | $H_2C=CH-COCH_3$ |
| 17. Polyvinyl alcohol | $(CH_2=CH-OH)_n$ |

Photo-initiators which may be used in the invention are given below by way of illustration, but not limitation: 2,2-dimethoxy-2-phenyl acetophenone, 4-hydroxy acetophenone, 2-hydroxy acetophenone, diethoxy acetophenone, dimethoxy acetophenone, and potassium persulfate/sodium meta bisulfite.

The photosensitizer appropriate for this invention may be ammonium dichromate.

Crosslinking agents which may be used in the invention are given below by way of illustration, but not limitation: N,N methylene bisacrylamide; paraformaldehyde; tetraethylene glycol diacrylate,; trimethylol propane triacrylate; and pentaerythritol triacrylate.

Grafting catalysts which may be used in this invention include, by way of illustration not limitation: ceric ammonium nitrate Ce $(NH_4)_2 (NO_3)_6$ and cupric nitrate $Cu(NO_3)_2$.

In general, grafting or graft copolymer is a high molecular weight backbone to which a second polymer is attached at regular or random intervals along the polymer chain. A backbone can have a homopolymer or copolymer with pendant groups of either type. In the present invention, gelatin, a tripeptide of glycine-proline-hydroxy proline acts as a principal backbone to which unsaturated monomer is attached through ceric ammonium nitrate or cupric nitrate initiation. In the following examples, their concentration ranged from 0.01% to 0.1% depending on the degree of grafting necessary to obtain optimum results. Reaction temperature for optimum grafting ranged from 45° C. to 65° C. for 10 to 40 minutes duration At this stage other ingredients such as sensitizers and crosslinking agents were added with continuous slow stirring at 45°-50° C. before spin coating on a clean glass plate. The spinning rate of the glass plate varied from 33 revolutions per minute (RPM) to 1000 RPM. As the RPM of the plate was increased, thickness of the coating decreased Generally, coating thickness was about 5 μm to 20 μm.

Gelatin is a hydrophilic polymer i.e. it likes or absorbs water especially at higher temperature for holographic application. This property of gelation is both advantageous and disadvantageous. Because of its hydrophobic nature, gelatin based holograms can be tuned to any desired peak wavelength, desired bandwidth, and refractive index modulation. However, the very same characteristic of gelatin or DCG becomes problematic if the DCG coating or hologram is exposed to high humidity and high temperature. This is where the importance of grafting is realized, i.e., grafting significantly reduces the hydrophilicity of gelatin, thus yielding the optical and holographic advantages of the present invention. This is achieved by choosing unique polymerizable (unsaturated) monomer with multiple functional groups and condensing, through grafting, hydrophilic groups of gelatin with hydrophobic or hydrophilic groups of polymerizable monomers, thus removing hydrophilic groups in a single step. As a result, only hydrophobic groups remain on the gelatin. Moreover, multifunctionality of polymerizable monomer as well as crosslinking agents provide an extraordinarily high degree of crosslinking which provides additional protection due to a thick molecular network of moisture-resistant clusters that build during processing. This indeed is a unique phenomenon made possible by grafting in accordance with the present invention. As a result, one can get high temperature stability (200° C.), low temperature stability (−180° C.), high laser damage threshold (4C,W/cm$^2$) and stability under pressure (40°-50° psi/80° C.).

The invention will be further illustrated by, but is not to be limited to, the following examples in which all parts and percentages are by weight unless otherwise specified.

EXAMPLE I

The example illustrates a preferred composition using ammonium dichromate as a sensitizer: Gelatin (Vee Gee 300 Bloom, Type A) 20 g; DI (deionized) water 200 ml; acrylamide 1 g; ceric ammonium nitrate 0.1 g.

Gelatin was mixed with DI water at room temperature and slowly heated to 45°-50° C. in water bath for one hour. The gelatin slowly dispersed and dissolved in water at this temperature within one hour. Occasional stirring was necessary to obtain a clear solution. To this clear solution, a solution of acrylamide in DI water was added with constant stirring followed by ceric ammonium nitrate. Stirring and heating was continued for ten more minutes, after which the viscous solution was spin coated on a clear ordinary window glass plate 4"×5" in dimension cleaned with soap water, rinsed with DI water, dried and used as a coating substance.

The uniform coating was obtained by pouring 25 ml viscous solution of Example I at the center of the plate, and spinning the plate at uniform speed (78 RPM) for five minutes. The plate was then stored in a laminar flow hood horizontally for several hours before exposing to laser light.

In the presence of ammonium dichromate and water molecules, gelatin has the tendency to crosslink especially when it is subjected to laser radiation. In order to enhance the degree of crosslinking the relatively reactive sides on the gelatin polymer may be advantageously utilized to graft the multifunctional monomer which in turn may be involved in the crosslinking process. As is evident in Example I acrylamide in the presence of ceric ammonium nitrate is attached to gelatin backbone either through Gelatin—CH$_2$ CH$_2$ CO—NH-—and/or In the following examples the procedure is the same as in Example I except that the composition was different and viscosity of the composition was higher.

EXAMPLE II

| | | |
|---|---|---|
| Gelatin (Vee Gee BLOOM 275 Type A) | → | 20 g |
| Water | → | 200 ml |
| Ammonium dichromate | → | 1 g |
| 2-Hydroxy ethyl methacrylate | → | 1 ml |
| Cupric chloride | → | 0.1 g |
| Parotoluene sulfonic acid | → | 0.01 g |

In this example, 2-hydroxyethyl acrylate in the presence of cupric chloride was attached to gelatin backbone which helped enhance the degree of crosslinking of the gelatin polymer. The presence of a small quality of paratoluene sulfonic acid assisted in hardening the gelatin through sulfur crosslinking

EXAMPLE III

| | | |
|---|---|---|
| Gelatin (Vee Gee Bloom 275 Type A) | → | 20 g |
| DI Water | → | 200 g |
| 2-Hydroxyethel Methacrylate | → | 2 g |
| Cupric Chloride | → | 0.2 g |
| Ammonium Dichromate | → | 1.5 g |
| Formaldehyde | → | 0.5 g |
| p-toluene Sulfonic Acid | → | 0.01 g |

As is clear from Example III, a small quantity of paraformaldehyde considerably increased the degree of crosslinking both in the solution form (which was evident from the increased solution viscosity) and solid form.

Another way of increasing the crosslinking clusters within a thin coating of the holographic film is by adding more than one multifunctional monomer in the gelatin formulation. Furthermore, these monomers, when they are being grafted onto the gelatin backbones, can be simultaneously crosslinked by adding crosslinking agents whose molecular structure is very similar to that of the monomers used in the formulation.

Example IV below is an example of this where acrylamide and acrylic acid are vinyl monomers whereas N,N-Methylene bisacrylamide is a vinyl crosslinking agent. Thus, acrylamide, acrylic acid graft polymerized on gelatin along with N,N-Methylene-bis-acrylamide creates a cluster of crosslinking due to the presence of reactive groups in gelatin, acrylamide, acrylic acid, and N,N-Methylene-bis-acrylamide. Such crosslinking can further be enhanced through holographic processing which will be discussed further below.

EXAMPLE IV

| | | |
|---|---|---|
| Gelatin (Knox Bloom 269 Type T-5286) | → | 20 g |
| DI Water | → | 200 g |
| Acrylamide | → | 1 g |
| Acrylic Acid | → | 0.5 g |
| N,N-Methylene-bis-acrylamide | → | 0.2 g |
| Cupric Chloride | → | 0.1 g |
| Ammonium Dichromate | → | 1 g |
| Parotoluene Sulfonic Acid | → | 0.01 g |

In Example IV, an additional crosslinking agent catalyst such as paratoluene sulfonic acid was used to considerably increase the crosslinking network throughout the coating. In this case, we observed that the fixing time is very important because underfixing causes severe haze and fogginess (milkiness) on the surface of the processed holographic plate. Generally, 45 seconds to one minute fixing time is appropriate.

EXAMPLE V

| | | |
|---|---|---|
| Gelatin (Knox Bloom 269 Type T-5286) | → | 20 g |
| DI Water | → | 200 g |
| N-Methyl acrylamide | → | 1 g |
| N,N-Methylene-bis-acrylamide | → | 0.2 g |
| Cupric Chloride | → | 0.1 g |
| Ammonium dichromate | → | 1 g |
| Paraformaldehyde | → | 0.25 g |
| Parotoluene Sulfonic Acid | → | 0.01 g |

Instead of acrylamide, its N-Methyl substituted derivative was used in Example V in the graft coating formulation. In Example V paraformaldehyde enhanced solution viscosity of the grafted gelatin as well as crosslinking density in the processed hologram-films.

EXAMPLE VI

| | | |
|---|---|---|
| Gelatin (Knox Bloom 206 T = 5284) | → | 20 g |
| DI Water | → | 200 g |
| N,N (di-2-hydroxyethyl) methacrylamide | → | 0.3 g |
| Cupric Chloride | → | 0.05 g |
| Paraformaldehyde | → | 0.25 g |
| Ammonium Dichromate | → | 1 g |
| Parotoluene Sulfonic Acid | → | 0.01 g |

In Example VI N,N(di-2hydroxyethyl) methacrylamide was grafted to the gelatin polymer backbone during the reaction time. Here again, paraformaldehyde and paratoluene sulfonic acid helped enhance the crosslinking which was also evident from the viscosity of the solution.

EXAMPLE VII

| | | |
|---|---|---|
| Gelatin (Knox Bloom 206 T = 5284) | → | 20 g |
| DI Water | → | 200 g |
| N-Ethyl methacrylamide | → | 0.3 g |
| Cupric Chloride | → | 0.1 g |
| Ammonium Dichromate | → | 1.0 g |
| Paraformaldehyde | → | 0.2 g |

-continued

| Paratoluene Sulfonic Acid | → | 0.01 g |

In Example VII, N-Ethyl methacrylamide instead of N-Methyl acrylamide as in Example V or Acrylamide as in Example IV was used in the graft coating formulation.

EXAMPLE VIII

| Gelatin (Vee Gee Bloom 300 Type-A) | → | 20 g |
|Dl Water | → | 200 g |
| Acrylamide | → | 1 g |
| Acrylic Acid | → | 0.5 g |
| Diamethacrylamide | → | 0.3 g |
| Ceric Ammonium Nitrate | → | 0.2 g |
| Ammonium Dichromate | → | 1 g |
| Paraformaldehyde | → | 0.25 g |
| Paratoluene Sulfonic Acid | → | 0.01 g |

In Example VIII, acrylamide, acrylic acid and dimethacrylamide were the grafting monomers whereas paraformaldehyde and paratoluene sulfonic acid were the crosslinking catalysts. In this example the gel was not solution cast but was put between two glass plates such that its thickness was considerably increased. This holographic thick system was especially useful for multiple recording and storage of holograms.

EXAMPLE IX

| Gelatin (Vee Gee Bloom 300, Type-A | → | 20 g |
| Dl Water | → | 200 g |
| Barium Acrylate | → | 0.5 g |
| Acrylamide | → | 0.5 g |
| N,N-Methylene-bis-acrylamide | → | 0.2 g |
| Ceric Ammonium Nitrate | → | 0.1 g |
| Ammonium Dichromate | → | 1 g |
| Paraformaldehyde | → | 0.2 g |
| Paratoluene sulfonic Acid | → | 0.01 g |

EXAMPLE X

| Gelatin (Vee Gee Bloom 275 Type A) | → | 20 g |
| Dl Water | → | 200 g |
| Polyvinyl alcohol | → | 0.5 g |
| Acrylamide | → | 1 g |
| Acrylic Acid | → | 0.5 g |
| N,N-Methylene-bis-acrylamide | → | 0.25 g |
| Ammonium Dichromate | → | 1 g |
| Paratoluene Sulfonic Acid | → | 0.01 g |
| or Paraformaldehyde | → | 0.1 g |

Example X also yielded an extremely viscous solution as a result of extraordinarily high crosslinking caused by simultaneous polymerization, grafting and molecular network formation process during mixing, exposure and processing. N,N-methylene bis acrylamide and paraformaldehyde and paratoluene sulfonic acid helped increase the crosslinking sites in the grafting monomers and gelatin/polyvinyl alcohol varieties respectively.

After mixing and coating, the composition is exposed or recorded. The basic technique of standing wave holographic recording may be summarized as follows: (1) a laser beam of wavelength λ is incident on a layer (typically 10–20 μm) of photosensitive holographic emulsion; (2) this laser beam passes through the holographic emulsion and is reflected by a mirror; (3) the reflected beam interferes with the incoming beam to set up a standing wave pattern in the holographic emulsion; (4) this standing wave pattern produces a set of interference fringes (layers), i.e., where constructive interference occurs within the material a greater amount of energy is deposited, and where destructive interference occurs, virtually no energy is deposited; (5) the optical pattern is transformed via a hardness differential which is related to refractive index modulation according to the Lorenz-Lorentz formula in the IR, visible, and UV regions of the electromagnetic spectrum.

In a preferred set up used to fabricate the high efficiency holographic optical element from a composite graft of DCG, an Argon Ion laser from Coherent Inc. (Innova 100) was used to expose the coating at wavelength $\lambda = 488$ nm or $\lambda = 514$ nm. The exposure energy was about 200 mj/cm$^2$. The volume Bragg Lippmann recording created in this fashion is described by Kogelnik's coupled wave theoretical model.

After recording, the material is processed. A preferred processing method is summarized in Table 4 below.

TABLE 4

Coating and Processing Conditions to Obtain High Efficiency Holographic Optical Elements in Composite Graft Polymers

| Step # | Direction | Comments | Lighting |
|---|---|---|---|
| 1 | Coated plate was exposed to Argon Laser of wavelength $\lambda = 488$ | Normal incidence or slanted incidence or Argon-UV-laser | Dim Yellow |
| 2 | The plate was soaked in 20% isopropyl alcohol for 1 min. at room temperature | Done in hood with constant agitation | Dim Yellow |
| 3 | Soak in mixture of 80 parts isopropyl alcohol 20 parts water at 50° C. for six minutes | Done with continuous agitation | Dim Yellow |
| 4 | Dehydrated in 100% isopropyl alcohol at 40–60° C. for 2-3 minutes | Done with agitation | Dim |
| 5 | Dehydrated in 100% isopropyl alcohol at 82° C. (reflux temp) for 20 min. | Plate should be angled with 2-3 cm portion deep into alcohol | Dim Yellow |
| 6 | Dried with hot air over isopropyl alcohol vapors first and then in air, one minute each | Hologram appears immediately | Dim Yellow |

In general, the mechanism by which the photochemical process works in forming holographic structure in the material is now described though applicants do not wish to be bound by any particular theory. When partially dried dichromated polymer (DCP) coating is exposed to light, hexavalent chromium ions in the presence of polymer and water molecules absorb the photon and the photochemical reaction begins During the course of this photochemical process, hexavalent chromium $Cr^{+6}$ is photoreduced to trivalent $Cr^{+3}$. This trivalent $Cr^{+3}$ forms a cross link between neighboring polymer chains. There is approximately an equal number of uncrosslinked and lightly crosslinked sites where the chromium $Cr^{+3}$ forms a coordination complex with carbonyl and/or hydroxy groups Such uneven, inhomogeneous crosslinking hardens the DCP coating layers unevenly, creating a hardness differential between highly crosslinked and less crosslinked regions. This hardness differential produces modulation of the refractive index.

Such high efficiency holographic structures give refractive index modulation of 0.04 to 0.08 or higher, which can further be modified by grafting in accordance with the present invention. From a theoretical point of view grafting enhances refractive index modulation as follows. In the case of amorphous or crystalline materials, it is valid to use the model of anisotropic materials (gases, liquids, mixtures of liquids, etc.). Hence, we can use the very general Lorenz-Lorentz formula which can be rewritten in the form (for small $\Delta n$):

$$n^2 = \frac{1 + 2\frac{\rho}{\mu} \cdot A}{1 - \frac{\rho}{\mu} \cdot A} ; \qquad \text{Eq. (1)}$$

where n is refractive index, $\mu$ is the molecular mass, $\rho$ is the material density, and A is the molar refractivity defined as:

$$A = \frac{4\pi}{3} N_m \alpha; \qquad \text{Eq. (2)}$$

where $N_m$ is the Avogadro number, $\alpha$ is the mean polarization, and $n = n(\rho, \alpha)$ i.e, refractivity index, can be modified by changes in $\rho$ or $\alpha$ and $\rho$ in turn is directly affected by grafting which makes the material more dense. We obtain the following fundamental equation:

$$\frac{\Delta n}{n} = \frac{1.5 B}{(1 - B)(1 + B)} \cdot \frac{\Delta \rho}{\rho} ; \qquad \text{Eq. (3)}$$

Where $B = [(\rho/\mu)A]$ which holds in the general case of high efficiency holography (n is bias refractive index). Assuming a typical value of $n \sim 1.5$ (for DCG, $n = 1.54$, and for a polymer graft $n = 1.48$), the following useful expression is obtained:

$$\frac{\Delta n}{n} \approx 0.4 \cdot \frac{\Delta \rho}{\rho}, \qquad \text{Eq. (4)}$$

From Eq. 4 it can be seen that material density modulation directly enhances refractive index modulation which contributes to extremely high efficiency. In order to obtain $\Delta n = 0.05$, $\Delta \rho / \rho = 0.08$. Such large density fluctuations are only possible with polymer grafts described herein with partial wet processing. Assuming independent recording of N-gratings, the maximum index modulation $\Delta n$, should be $$\Delta n = N \cdot \Delta n. \qquad \text{Eq. (5)}$$

where, $\Delta n$ is the minimum refractive index modulation necessary to obtain acceptable diffraction efficiency, $\eta$. For Lippmann gratings:

$$\eta = \tanh^2 \frac{\pi \Delta n \cdot T}{\lambda} ; \qquad \text{Eq. (6)}$$

where $\tanh^2$ is hyperbolic tangent, T is hologram thickness, and $\lambda$ is the wavelength in vacuum. Assuming $\lambda = 0.5$ $\mu$m, $T = 100\mu$, and $\eta = 99\%$, $\Delta n = 0.005$, and from Eq.(1), for $\Delta n = 0.1$, $N = 434$. Thus, in order to obtain high interconnectivity (necessary in neurooptics applications for instance), $\Delta n_m$ and T must be large and $\Delta n$ is directly increased by grafting.

With regard to resolution, for Lippmann geometry, the grating constant is $$\Lambda = \frac{\lambda}{2n} \qquad \text{Eq. (7)}$$

and material resolution f, is $$f = \frac{1}{\Lambda}. \qquad \text{Eq. (8)}$$

Assuming, for UV-applications (protection against tripled Nd:YAG-wavelength-333 nm), and $n = 1.5$, a composite graft hologram in accordance with the present invention yields $\Lambda = 11$/nm and $f = 9,000$ lines/mm whereas state of the art holograms yield only $\Delta n_m = 0.050$ and $f = 6,000$ lines/mm. Thus, grafting enables this material to be used not only in the IR and visible regions but also in the UV and soft X-ray region of the electromagnetic spectrum. Grafting in accordance with the present invention yields versatility in addition to making the material or a system based on the material rugged and stable in extreme environments.

As a result of monomer polymer grafts in accordance with the present invention, the number of crosslinking sites are increased. As shown in FIGS. 1A-D these extra crosslinking sites in the presence of additional crosslinking agents help increase the crosslinking density during holographic exposure and chemical wet processing. The enhanced crosslinking renders material density variation which directly contributes to the refractive index modulation. Thus, index modulation through grafting, optimized exposure, and processing may be as high as 0.2 or more with little scattering (low surface roughness). Furthermore, preferred dichromated gelating graft holograms can be reproduced to produce desired retractive index modulation, peak wavelength and/or bandwidth. It should also be mentioned that DCG graft is extraordinarily stable at low temperatures as well as high temperatures ($-180°$ C. to $200°$). In addition DCG graft holograms have a very high laser damage threshold (4 G Watt/cm$^2$ at 351 nm wavelength). Holograms made in accordance with the present invention may advantageously be used for optical interconnects, memory storage, coherence filters, diffusers, Raman filters, Fabry-Perot Etalons, and infrared reflecting windows, among many other applications.

Figure 1A:
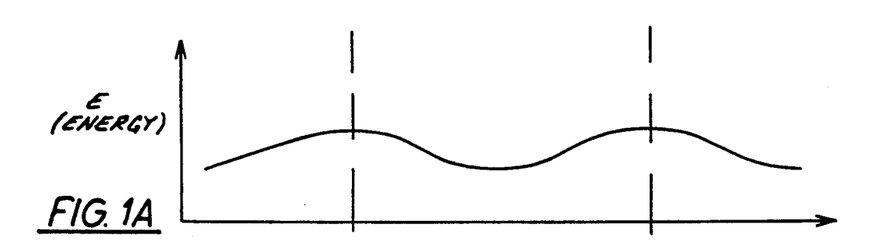
FIGS. 1A–D are schematics showing energy E, material density $\phi$, crosslinking $\psi$, and refractive index modulation $\Delta n$, respectively in a material in accordance with the present invention during processing.
Figure 1B:
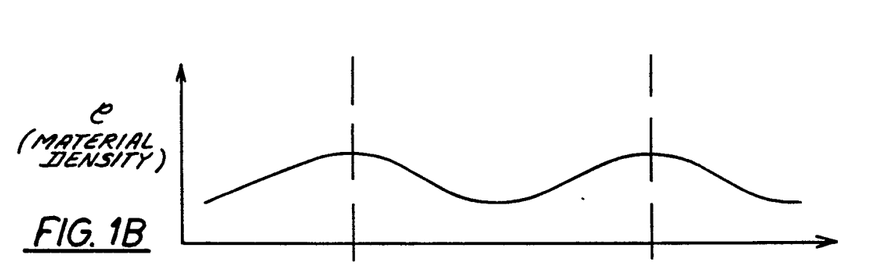
Figure 1C:
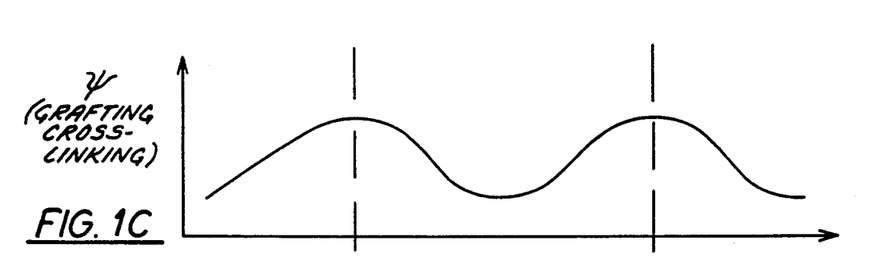
Figure 1D:
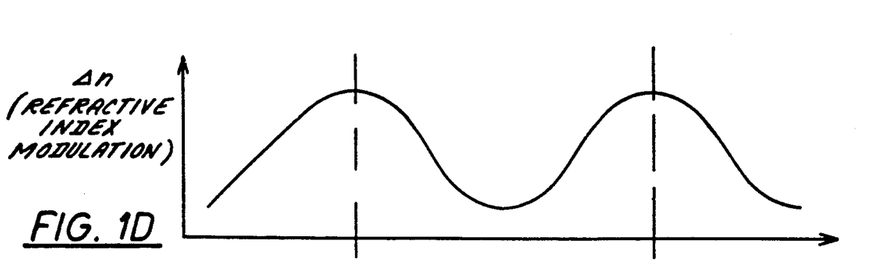
Figure 2:
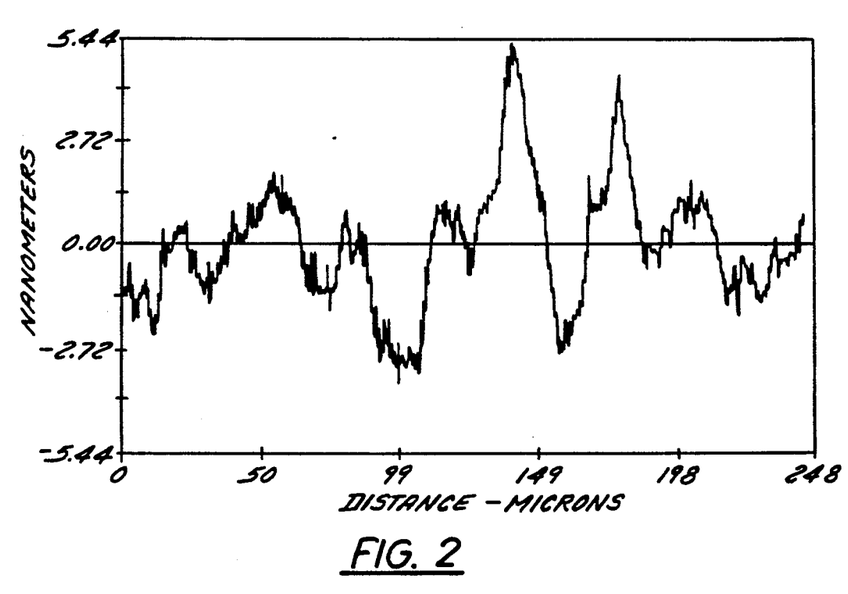
FIG. 2 is a graph showing a typical surface roughness profile of a DCG XUV HOE.
Figure 3A:
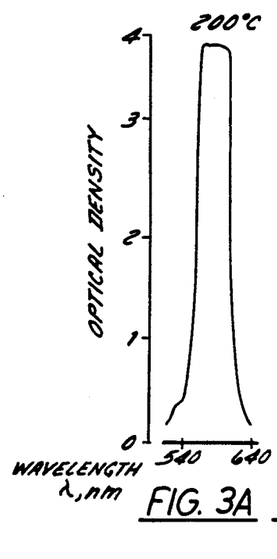
FIGS. 3A–E are graphs showing optical density versus wavelength as a function of temperature for 200°, 160°, 140°, 120° and 100°, respectively.
Figure 3B:
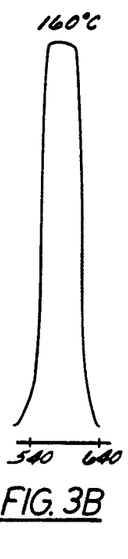
Figure 3C:
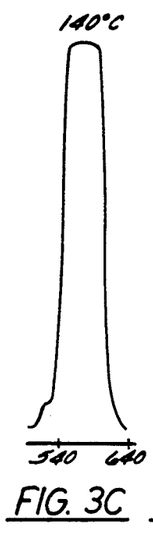
Figure 3D:
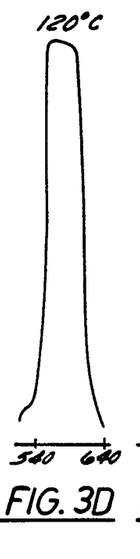
Figure 3E:
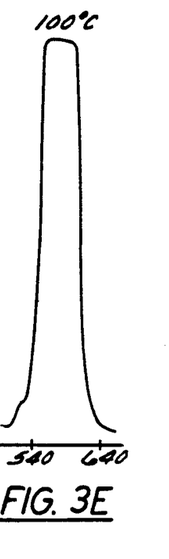

In order to better illustrate the advantages noted above of DCG graft polymer as a holographic material, the following material analysis research is described briefly. The composite graft polymers of the present invention exhibit very low surface roughness. With regard to surface roughness measurements, which directly affect scattering properties of the hologram, the Fresnel formulas are obtained by imposing the boundary conditions on the electromagnetic field at the surface between two materials. In the derivation of the Fresnel formulas, it is assumed that the interface is perfectly smooth, In fact, even the best optical surfaces have rms surface roughness that is on the order of a few angstroms. The effect of surface roughness is to reduce the amount of light specularly reflected (scattered) from an interface to a value that is lower than that given by the Fresnel equations. Shown in FIG. 2 is a typical surface roughness profile of DCG XUV (soft x-ray) HOEs.

In Table 5, typical rms surface roughness values of the 23 most common materials used in deposited multilayers are listed. The range of these values is 10-30 Å, which is typical of deposited multilayers.

TABLE 5

| Surface Roughness Values of Thin Film Materials | |
|---|---|
| MATERIAL | RMS Å |
| C | 17 |
| Cu | 13.3 |
| Synthetic Diamond | 10 |
| Al | 21.3 |
| Si | 18.7 |
| CVD SiC | 15 |
| Ti | 18.3 |
| Zr | 16.3 |
| Nb | 15.7 |
| Mo | 14 |
| Mg | 33 |
| Ru | 16.3 |
| Rh | 11.4 |
| Pd | 18 |
| Ag | 19.7 |
| Hf | 11.6 |
| Ta | 10.9 |
| W | 10.1 |
| Re | 12.2 |
| Os | 12.3 |
| Ir | 11.3 |
| Pt | 14.4 |
| Au | 15.5 |

Laser damage thresholds of the composite graft polymer of the present invention are high. Tests were performed with a Nd:YAG laser that was frequency tripled to operate at 0.347 μm. The sample plates to be tested were selected such that the optical density at the test wavelength of 355 nm was at a maximum (3.7). The samples were conditioned by heating in an oven at 80° C. for three hours and left overnight at humidities less than 50%. The test procedures involved marking the area on the selected plates and photographing that area before subjecting it to the high power laser pulse. After each exposure or pulse the area was examined for damage and photographed under enhanced magnification. The exposed area changed in appearance and appeared to have melted, and caused the formation of microbubbles. In some cases the exposed area was burned.

The laser damage threshold for samples prepared from Example 1 appeared to be about 6 G/cm² which corresponds roughly to 1 G/cm². The highest threshold achieved in these tests was 21 J/cm² which corresponds to 4 G/cm².

The gelatin-polymer graft of the present invention exhibits high temperature stability. High temperature stability tests were performed in a closed oven under atmospheric pressure on a sample made in accordance with Example 1 and cut into five different samples A-E. Each of the grafted holographic samples A-E were first conditioned at 80° C. for several hours before testing each at a high temperature. Table 6 shows temperature, duration, and optical characteristics after subjecting each filter sample to high temperatures.

TABLE 6

| High Temperature stability study of holographic filters at temperatures higher than 200° C. | | | | |
|---|---|---|---|---|
| Sample Code | Temperature °C. | Time | Optical Density | Peak Wavelength λnm | Bandwidth λnm |
| A-E | 80 | 3 hr. | 4 | 590 | 52 |
| A | 200 | 10 min. | 4 | 577 | 46 |
| B | 160 | 16 hr. | 4 | 577 | 46 |
| C | 140 | 10 min. | 4 | 588 | 47 |
| D | 120 | 10 min. | 4 | 590 | 49 |
| E | 100 | 10 min. | 4 | 590 | 50 |

From Table 6 it can be observed that there is no significant effect of temperature on optical properties of the holographic filters. The optical density and half-length full bandwidth remain virtually unaffected by an increase in temperatures to 200° C. This fact is also evident from FIGS. 3A-E which depict optical density (O.D.) vs wavelength as a function of temperature for samples A-E where no change in peak height corresponding to optical density of 4 is observed. O.D. spectra were recorded on a Varian 2300 Spectrophotometer after the sample was subjected to high temperature conditions. Grafting yields the highest possible optical density because of high index modulation. Grafting also yields a uniform and tunable bandwidth and tunable peak wavelength. Grafted holographic filters in accordance with the present invention may survive temperature variations to at least 200° C.

Scanning electron micrographs (not shown) of volume/phase HOEs through cross-section seem to reveal the physical phenomenon responsible for the high diffraction efficiency. Shankoff was the first to use electron microscopic techniques to demonstrate hard and soft regions within the thin holographic coating which resulted from exposure, swelling and nonuniform shrinkage during alcohol processing. Shankoff, T. A., Phase Holograms in Dichromated Gelatin, Appl. Opt. 7, 2101 (1968).

Samples for scanning electron microscopy (SEM) have to be prepared very carefully to avoid interaction and mix-up of Bragg planes due to vibrations and irregularities during the cutting process. The cross-section can be created by (a) cooling the holographic film to −180° C. with liquid nitrogen and breaking it by twisting, or (b) cutting the soft holographic film by microtombing commonly used to fragment biological tissues and cells.

The second method used a diamond cutter. The cut cross-sections were metalized with gold (approximate thickness of gold coating was 40 nm). The metalized holographic film cross-section was held vertically on a circular disk and introduced into the electron microscope chamber. The vertical and horizontal axes were adjusted to obtain a well focused picture of the Bragg planes.

Using electron microscopy photographs, the grating constant (Bragg spacing) was found to be 164 nm. This spacing can also be determined theoretically by using the Bragg condition. In this test, the recording wavelength was 514 nm and the refractive index of the holographic medium (DCG) was 1.54. Thus, the calculated Bragg spacing is 167 nm, in good agreement with the experimental value obtained from the SEM. Grafting in accordance with the present invention allows highly uniform spacing between Bragg planes. Within the Bragg planes the polymeric chains are highly crosslinked. In between planes the chains are lightly crosslinked.

Figure 4A:
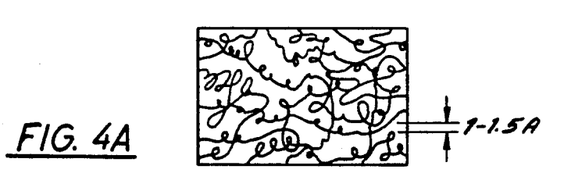
FIGS. 4A–C are schematics of cross-sections of a photopolymer in accordance with the present invention progressively undergoing grating formation.
Figure 4B:
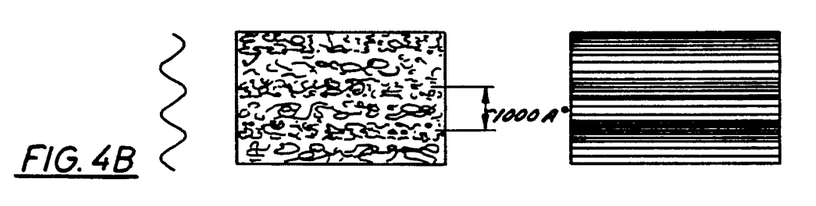
Figure 4C:
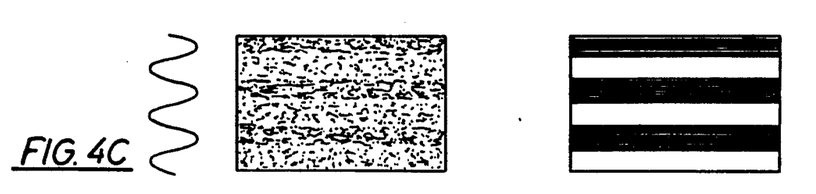

FIGS. 4A–C are a schematic of cross-sections of a photopolymer in which grafted volume holographic gratings are being created by: (A) exposure to light; (B) dark reaction/partial fixing; (C) fixing and processing. The final material density modulation (resulting in refractive index modulation) is caused by grafting which yields highly crosslinked macromolecular webs that reside in separate Bragg planes.

It is to be understood that embodiments of the present invention not disclosed herein are fully intended to be within the scope of the claims.

We claim:

1. A holographic recording material for use in a volume hologram comprising a dichromated gelating-polymer graft.

2. The holographic recording material as defined in claim 1 wherein the gelatin comprises naturally occurring gelatin.

3. The holographic recording material as defined in claim 1 wherein the polymerizable monomers used to make the gelatin-polymer graft are 2-hyroxyethylmethacrylate, acrylamide, acrylic acid, or vinyl acetate.

* * * * *

UNITED STATES PATENT AND TRADEMARK OFFICE
CERTIFICATE OF CORRECTION

PATENT NO. : 5,230,969
DATED : July 27, 1993
INVENTOR(S) : Savant et al

It is certified that error appears in the above-indentified patent and that said Letters Patent is hereby corrected as shown below:

Col. 10, line 7, after "duration" insert -- . --;
      line 13, after "decreased" insert -- . --;

Col. 14, line 58, after "begins" insert -- . --; and
    line 65, after "groups" insert -- . --.
Column 16, line 63, delete "smooth," and substitute therefore --smooth.--

Signed and Sealed this

Twenty-second Day of March, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,230,969
DATED : July 27, 1993
INVENTOR(S) : Savant et al

It is certified that error appears in the above-indentified patent and that said Letters Patent is hereby corrected as shown below:

Col. 8, line 12, delete "isoinonic" and substitute therefore -- isoionic --.

Col. 10, line 28, after "choosing" insert -- a --; and
    line 67, after "dimension" insert -- , --.

Col. 11, line 40, delete "quality" and substitute therefore -- quantity --.

Signed and Sealed this

Twenty-sixth Day of July, 1994

Attest:

BRUCE LEHMAN

*Attesting Officer*   *Commissioner of Patents and Trademarks*